United States Patent [19]

Jordan, III

[11] Patent Number: 4,940,256
[45] Date of Patent: Jul. 10, 1990

[54] TANK TRUCK - STORAGE VESSEL

[76] Inventor: John W. Jordan, III, Rte. 1, Box 326A, Fairview Rd., Fountain Inn, S.C. 29644

[21] Appl. No.: 447,718

[22] Filed: Dec. 8, 1989

Related U.S. Application Data

[63] Continuation of Ser. No. 200,032, May 27, 1988.

[51] Int. Cl.$^5$ ................................................ B60P 3/22
[52] U.S. Cl. ...................................................... 280/837
[58] Field of Search ...................... 280/837, 433, 766.1

[56] References Cited

U.S. PATENT DOCUMENTS

| | | | |
|---|---|---|---|
| 1,167,792 | 1/1916 | Byron | 280/766.1 |
| 3,080,173 | 3/1963 | Johnson et al. | 280/837 |
| 3,527,476 | 9/1970 | Winckler | 280/837 |
| 3,791,674 | 2/1974 | Berends | 280/433 |
| 4,135,596 | 1/1979 | Silba | 280/837 |
| 4,256,324 | 3/1981 | Hamilton | 280/433 |
| 4,657,274 | 4/1987 | Mann et al. | 280/433 |
| 4,819,955 | 4/1989 | Cobb | 280/837 |

FOREIGN PATENT DOCUMENTS 2727834 12/1977 Fed. Rep. of Germany ...... 280/837
1313710 4/1973 United Kingdom ................ 280/837

Primary Examiner—Kenneth R. Rice
Attorney, Agent, or Firm—Dority & Manning

[57] ABSTRACT

Apparatus for transporting and storing liquids such as chemicals and the like which does not require any handling of the chemicals at the site where such chemicals are used. A tank for containing the chemicals is supported on a longitudinal trailer frame which, in turn, is provided with wheels at one end and a gooseneck fifth wheel type connector at an opposite end. The fifth wheel is receivable within a recess in a flatbed of a prime mover and connectible to a mateable receiving element thereto for transport from one point where the chemicals are loaded into the tank to the plant or other location where the chemicals are to be used. Adjustable length support legs are provided on an end of the trailer opposite the wheels for supporting the storage tank in a horizontal plane when the fifth wheel is detached from the prime mover. A self-contained pumping system is provided on one end of the longitudinal frame for pumping liquid out of the tank. The pumping system may be driven by a gasoline engine or other power source.

16 Claims, 4 Drawing Sheets

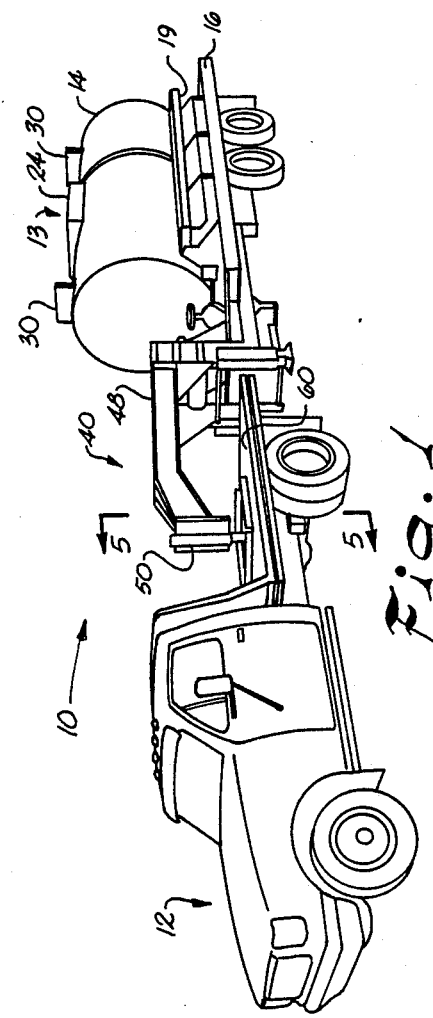
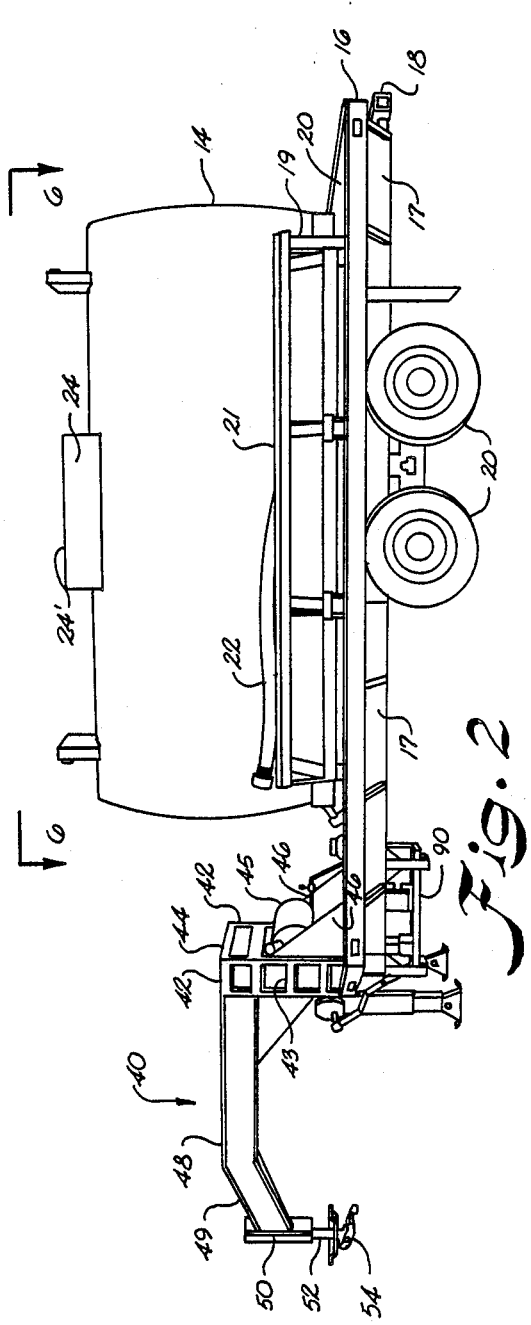

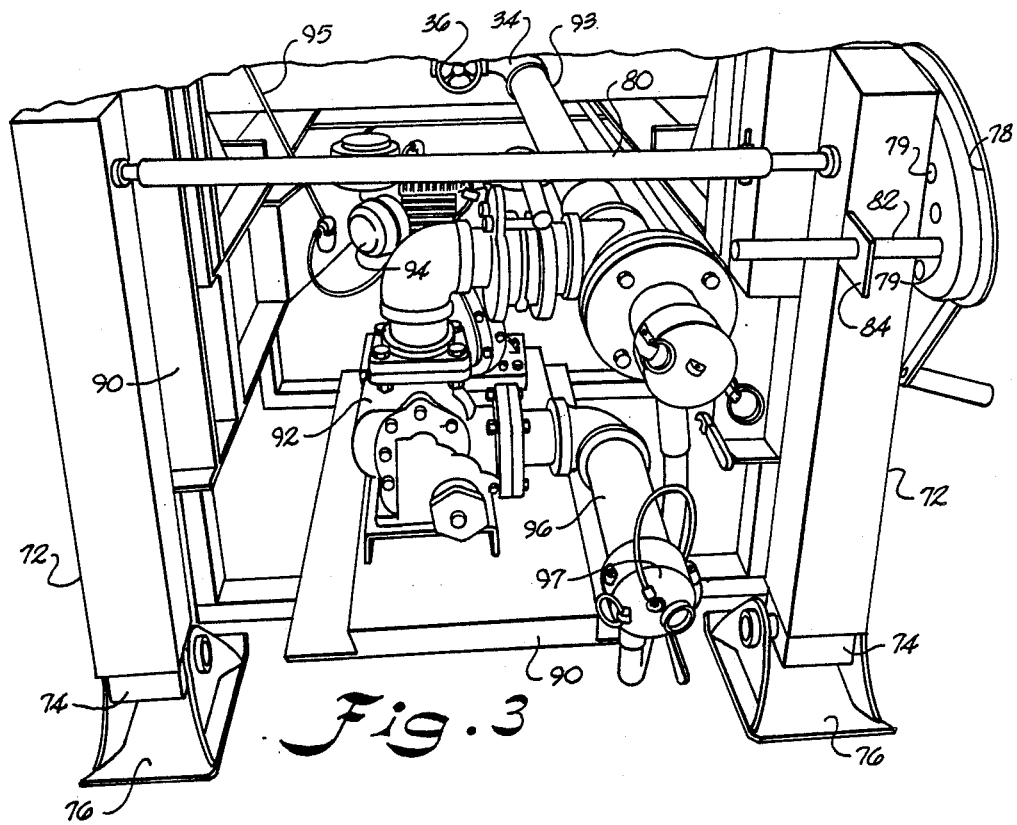
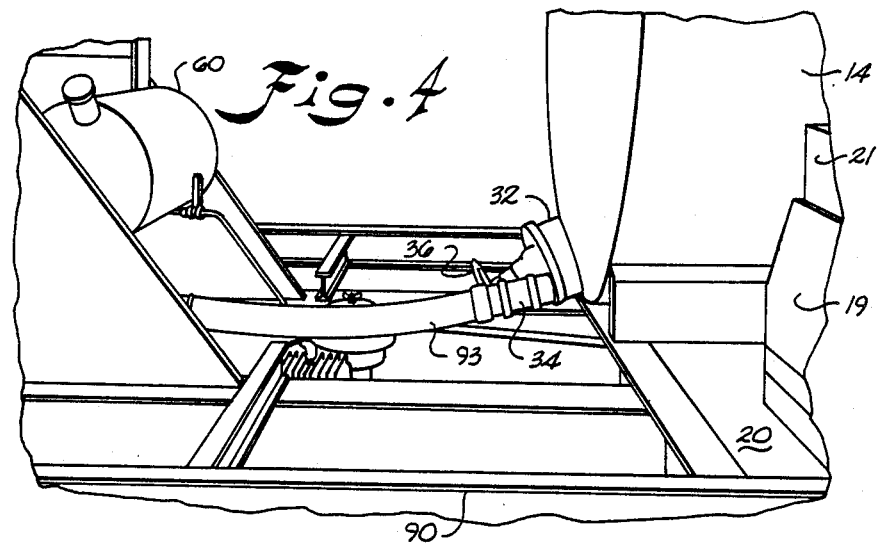

TANK TRUCK-STORAGE VESSEL

This is a continuation of application Ser. No. 200,032 filed May 27, 1988.

BACKGROUND OF THE INVENTION

This invention relates to apparatus for transporting and storing a supply of liquid chemicals. More particularly, the present invention relates to a self-contained tank which is adapted to be transported by a prime mover such as a flatbed truck to a site where chemicals contained in the tank are to be utilized. The prime mover is also adapted to be detached from the storage tank, and is useful for other hauling or transportation chores.

In the past, in order to transport and store liquid chemicals at a work site it has been necessary to transport such chemicals in massive tank trucks or railroad tank cars to the plant where such chemicals are needed. Thereafter, at the plant site the chemicals are then pumped from the tank truck or railroad car into permanent storage tanks maintained by the user of such chemicals. This necessitated numerous handlings of the chemicals and increased the risk of chemical spill.

In addition, inadvertent chemical spills could be extremely costly or represent a health hazard. Also, when one constructs permanent storage vessels for liquid chemicals, significant capital expenditures are the norm. For example, due to the corrosive nature of most chemicals, chemical storage vessels are often constructed from stainless steel, and are conventionally located out of doors. Exposure to continuous use and to the elements lends to leakage of the vats, and/or malfunction of valves, pumps and the like unless proper preventative measures are practiced.

Further, oftentimes the chemical needs vary such that the permanent storage vessels of the types noted above are either not used or are only partially filled.

The present invention affords a solution to all of the problems noted above. While the prior art includes tank trailers of various and sundry structures; fifth wheel connections for trailers and the like, there is no prior art alone or in combination that is believed to anticipate or suggest the present invention.

SUMMARY OF THE INVENTION

A principle object of the present invention is to provide apparatus for transporting and storing chemicals that does not require transfer of the chemicals to storage tanks on the plant site.

Another object of the present invention is to provide apparatus for transporting and storing chemicals which permits the storage tank to be filled with the chemicals at the plant where such chemicals are manufactured, and then transported and stored at the plant where such chemicals are to be used.

A still further object of the invention is to provide apparatus for transporting and storing chemicals which may be detached from its prime mover, and remain at the site of use of the chemicals until the chemicals are consumed.

These, and other objects as will become apparent, are attained by the provision of a transportable tank structure which may be filled at the point of manufacture of the chemicals and transported to the place of usage by a prime mover exemplified by a plant site. The prime mover may then be detached from the storage and transporting tank and may then be used for other transporting functions, while the tank structure may then remain at the site and become a self-contained storage vessel for the chemicals.

BRIEF DESCRIPTION OF THE DRAWINGS

The nature and characteristic features of the present invention will be more readily understood from the following drawings, in which:

FIG. 1 is a perspective side view of the apparatus according to the present invention;

FIG. 2 is a side view of a transporting and storage tank according to the present invention detached from the prime mover;

FIG. 3 is a perspective end view of a portion of the transporting and storage tank, illustrating the pumping mechanism for pumping chemicals from within the storage tank and support apparatus for the tank;

FIG. 4 is a partial side perspective view of apparatus of the present invention illustrating the connection between the storage tank and the pump;

DETAILED DESCRIPTION OF THE DRAWINGS

Figure 6:
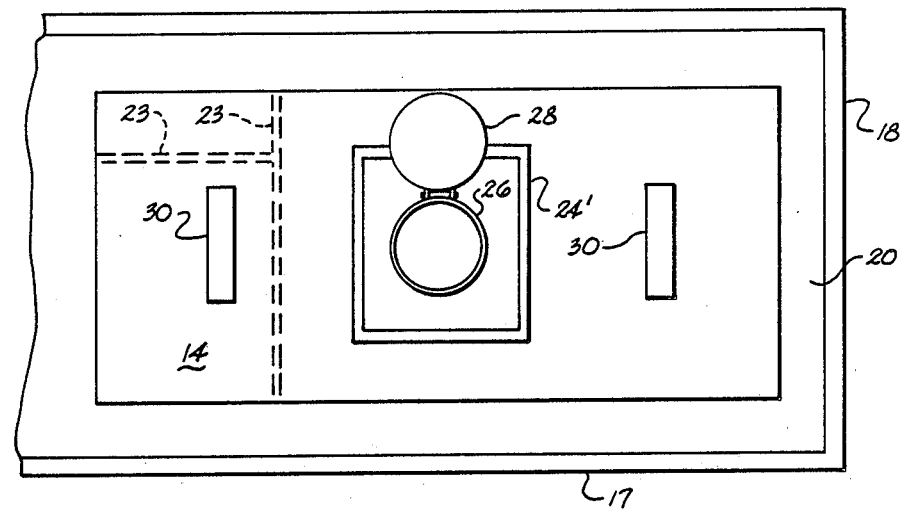
FIG. 6 is a partial top plan view of the storage tank of the invention illustrating the hatch for filling the storage tank, taken along line 6—6 of FIG. 2.
Figure 5:
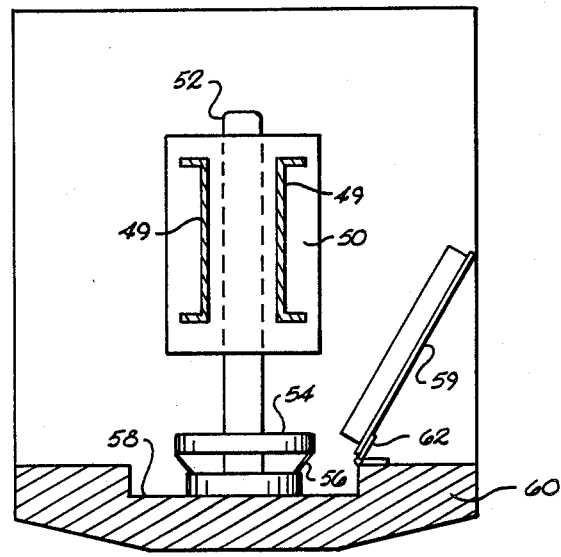
FIG. 5 is a sectional view of a portion of the apparatus of the invention taken along line 5—5 of FIG. 1.

Referring now to the drawings, apparatus generally 10 for transporting and storing a supply of liquid chemicals is illustrated and preferably includes, a prime mover generally 12 such as a truck or the like with a wheeled trailer generally 13 having a tank 14 secured thereto for transport and storage of chemicals or other liquids therein. Trailer 13 includes an elongated frame 16 which is formed of longitudinal members 17 and transverse members 18 welded or otherwise secured together. Frame 16 is supported on one end by a plurality of wheels 20 for movement over the road.

Frame 16 has a pair of cradle support structures 19 (only one shown) secured thereto and extending upwardly therefrom. Structures 19 are spaced apart by a predetermined distance adequate to receive a portion of tank 14 therein. Tank 14 is thus secured to frame 16 between support structures 19 for proper orientation on trailer 13. As can be seen from FIG. 2, tank 14 is shorter in length than frame 16 and is lesser in diameter than the width of frame 16. Horizontal portions 20 of frame 16 that extend outwardly from tank 14 may have planar surfaces to define a platform generally around tank 14. Platform 20 thus affords an area generally around tank 14 on which a workman may conveniently stand, if necessary, in connection with filling, repairing, securing, or otherwise working on tank 14. Support structures 19 further have located along an upper end of same a tray 21 or other structure in which necessary equipment may be stored for use in connection with tank 14 such as by way of example, a hose 22 as is illustrated in Figure 2.

Tank 14, though illustrated as a cylinder could take any other convenient or desired shape. Further, since tank 14 is primarily designed for transport and storage of liquids, a series of baffles 23 (partially shown in phantom in FIG. 6) may be incorporated within tank 14 to minimize load shifts which could otherwise occur if less than a full load is being transported. It is not, however, intended that the representative partial arrangement of baffles 23 in FIG. 6 be anything more than exemplary of a baffling arrangement.

Tank 14 also includes a turret 24 secured to the top of same and extending upwardly therefrom. Located within the perimeter of turret 24 is an access hatch 26 having a hinged lockable lid 28. Access hatch 26 when closed terminates at a level below upper edges 24' of turret 24 whereby hatch 26 is protected by turret 24. Likewise a pair of upstanding elements 30 are secured atop tank 14 and extend upwardly to at least upper edges 24' of turret 24. Consequently in the event trailer 13 turns over during transit both turret 24 and upstanding elements 30 will protect hatch 26 from rupture or other damage.

Tank 14 is provided at a forward lower end of same with a drain outlet 32 equipped with a coupling 34 and valve 36 to permit tank 14 to be connected to an appropriate pipe, hose or the like for removal of the contents therefrom.

The front end of the horizontal frame 16 terminates in a structural arrangement defining a gooseneck connector generally 40, which is supported on the flatbed 24 of the prime mover in a recess 58. The cantilevered arch terminates in a fifth wheel 54 which permits the storage tank 14 and its horizontal platform to follow the prime mover during the transporting of the storage tank 14.

Gooseneck connector 40 includes a pair of spaced apart vertical struts 42 that extend upwardly, terminating above frame 16 and define a plurality of steps 43 therealong. Horizontal braces 44 are secured between struts 42 to unitize the structure. A space is defined between struts 42 and below braces 44 to receive a gas tank 45 the purpose of which will be described hereinafter. A pair of angled panels 46 are secured between a rear edge of struts 42 and an upper surface of frame 16 to strengthen gooseneck connector 40 and to protect gas tank 45.

A pair of spaced apart beams 48 are secured to a front side of an upper end of vertical struts 42 and extend outwardly therefrom generally parallel to frame 16 with converging downwardly projecting beams 49 secured to beams 48 at one end and to a generally vertical support sleeve structure 50 at the end of convergence. A shaft 52 is received within sleeve 50 and is movable therein. A fifth wheel connector 54 is secured to a terminal end of shaft 52 for conventional connection thereby to the prime mover 12.

The fifth wheel connection 54 is mateable with a fifth wheel receiving element 56 located within a recess 58 in the surface of the flatbed 60 of truck 12. Recess 58 is provided with a cover 59, which restores the flat surface of the bed of the prime mover 12 when the fifth wheel, and the gooseneck connector 40, are detached from their connection with the prime mover. Recess cover 59 is attached to the flatbed surface by means of a plurality of hinges 62 or the like.

As best seen in FIGS. 2 and 3, trailer 13 is provided with a supporting arrangement for use when trailer 13 is detached from truck 12. Particularly, a pair of spaced apart, retractable leg mechanisms are secured to frame 16 and depend downwardly therefrom. Each leg mechanism includes an upper tubular leg section 72 with a lower leg section 74 in telescoping relationship therewith. Lower leg sections 74 have a foot plate 76 pivotally secured thereto. A suitable mechanism (not shown) is provided within upper leg section 72 and is in operative association with lower leg section 74 to cause lower leg section to be raised or lowered with respect to upper leg section 72. Such mechanisms, as exemplified by a rack and pinion arrangement, are conventional and do not require further description. An actuator exemplified by a hand crank 78 may be employed to cause lower leg section 74 and foot plate 76 to be raised or lowered. As illustrated hand crank 78 is operatively associated with a shaft 80 that in turn is operatively associated with the mechanisms located within upper leg sections 72, e.g. pinions. Likewise, as shown a locking bar 82 is received by a bracket 84 secured to one of upper leg sections 72 and is manually moveable into an opening 79 of crank 78 when desired to lock crank 78 against movement and thus lock lower leg section 74 in its then location. Consequently when trailer 13 is being loaded, or is being positioned at a site where liquid from tank 14 is to be utilized, crank 78 can be turned to lower leg sections 74 until foot plates 76 are supported on the surface therebeneath. Trailer 13 is then stabilized for service as a free standing storage vessel, but which can be readily removed from the site when desired.

A front end of frame 16 of trailer 13 between tank 14 and gooseneck connector 40 is provided with a supporting skeletal framework 90 which depends downwardly therefrom. Located within framework 90 is a pump 92 which can be any type of pump suitable for pumping the contents of tank 14. Pump 92 has a drive means 94, such as a motor operatively associated therewith to supply operational power to pump 92 when desired. Preferably motor 94 is a gasoline engine which is operatively connected via a fuel line 95 to gasoline tank 45, though could be any type motor that will operate pump 92. Pump 92 is provided with appropriate piping on an inlet side such as pipe 93 for connection to coupling 34 of drain outlet 32, and on an outlet side with appropriate piping 96 and associated coupling 97 for connection to a plant line or the like (not shown).

With a transport and storage trailer as described above, a small load of liquid chemicals for example could be transported to a desired location by a truck 12. At the final destination, trailer 13 is disconnected from truck 12 and leg sections 74 are lowered by manipulation of crank 78 until foot plates 76 are firmly supported on the underlying surface such as the ground, a concrete pad or the like. Thereafter, once an appropriate plant supply line is coupled to pump outlet line 96, valve 36 can be opened and engine 94 started to pump chemicals from within tank 14 into the plant supply line. Trailer 13 in such capacity thus becomes a self-contained storage and pumping station for the chemical or other liquid contained in tank 14. Once the supply of chemicals in tank 14 becomes depleted, trailer 13 can be returned to the chemical plant, etc. for refilling tank 14 and then retransported to the usage site, or a new, filled trailer 13 can be substituted therefor.

The transport-storage apparatus according to the present invention can thus surplant the need for on site permanent storage, and/or is capable of use in locales where such a storage facility is only needed temporarily or where power for operation of the pump is not readily accessible. In like fashion, one transporting chemicals in smaller quantities can make economical use of the present invention since the cost of maintaining and operating conventional much larger rigs is eliminated.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitive of the invention so further described in such appended claims.

What is claimed is:

1. Apparatus for transporting and storing liquids such as chemicals and the like, comprising:
   (a) a tank for containing a liquid disposed upon a longitudinal frame, having an opening for filling said tank with liquid;
   (b) wheeled means for supporting one end of said longitudinal frame;
   (c) an extended connector means attached to an end of said frame opposite said wheels and, including a fifth wheel extending from the end of said connector means adapted for connection to a prime mover;
   (d) extendable support means secured to said frame adjacent said connector means for supporting said end of said longitudinal frame when said connector means is detached from said prime mover for free standing storage;
   (e) self-contained pumping means in association with said tank for pumping said liquid from said tank; and
   (f) a platform defined by said longitudinal frame surrounding said tank providing protection for said tank during transit and further providing an area for standing while working on said tank during free standing storage.

2. Apparatus as defined in claim 1 comprising further a prime mover having a generally flat load supporting surface with attachment means located thereon that is mateable with said fifth wheel.

3. Apparatus as set forth in claim 2, wherein said prime mover comprises a flatbed truck and a recess is defined by said bed and includes a cover which permits the prime mover to be used for other transporting tasks when detached from said transporting and storage apparatus.

4. Apparatus as set forth in claim 1, wherein said self-contained pumping means includes a pump and a motor for driving said pump.

5. Apparatus as set forth in claim 1, wherein said pump is powered by a gasoline engine.

6. Apparatus as set forth in claim 1, wherein said adjustable support means comprises a pair of extendable legs and means for extending said legs to support said other end of said longitudinal frame when said tank is detached from a prime over.

7. Apparatus as defined in claim 1 further including a turret secured atop said tank having a tank closure means located therein protecting said tank closure means.

8. Apparatus as defined in claim 1 further including upstanding elements secured atop said tank protecting said tank during transit.

9. Apparatus for transportation and storing liquid product comprising:
   (a) a trailer, said trailer including a longitudinal support frame extending therealong and having wheels supporting an end of same;
   (b) a tank received on a portion of said frame and secured thereat, said tank having liquid filling and draining ports thereon, the portion of said frame extending outwardly around said tank providing protection for said tank during transit and defining a platform providing an area for standing while working on said tank;
   (c) a support structure secured to said frame adjacent an end of said tank having said liquid draining port;
   (d) liquid pumping means received on said support structure and being operatively associated with said liquid drain port for pumping liquid from said tank;
   (e) drive means received on said support structure for driving said pumping means;
   (f) adjustable support elements secured to said frame at an end opposite said wheels permitting free standing storage of said liquid product if desired; and
   (g) extended connector means secured to an end of said frame opposite said wheels and being adapted for connection to a prime mover.

10. Apparatus as defined in claim 9 wherein said drive means for said pump is a gasoline engine and wherein a gasoline tank for supply fuel for said engine is received on said trailer.

11. Apparatus as defined in claim 9 wherein said tank has appurtenances thereon for protection of said liquid filling port in the event of overturn of said trailer.

12. Apparatus as defined in claim 11 wherein said extended connector means includes a gooseneck type structure having a fifth wheel connecting element received on an end of same and wherein said pumping means and said drive means therefor are located adjacent said gooseneck type structure and said structure affords protection therefor.

13. Apparatus for transporting and storing liquids such as chemicals and the like, comprising:
   (a) a longitudinal, wheeled frame, said frame defining a pair of spaced apart upstanding longitudinally extending supports along a portion of same, said frame further defining a planar surface outwardly from said upstanding supports;
   (b) a tank received between said upstanding supports and secured thereat, said tank having a turret structure secured atop of same, said turret having a tank closure means located therein below an upper surface of same, said tank being spaced inwardly from outer edges of said frame;
   (c) a connector structure located at a forward end of same frame, said connector structure extending upwardly from said frame for a predetermined distance and then outwardly away from said frame, said connector structure having a fifth wheel connection means at an outer free end of same
   (d) liquid pumping means received on said frame at said connector structure and being located at least partially therewithin for pumping liquid from said tank;
   (e) conduit connected between an outlet from said tank and said pumping means; and
   (f) support means secured to said frame adjacent said connector structure, said support means comprising a pair of spaced apart legs and means to raise and lower said legs between a supporting and nonsupporting position.

14. Apparatus as defined in claim 13 wherein said tank has support means located at opposite ends of a top side same, said support means extending upwardly to a point above said turret structure.

15. Apparatus as defined in claim 13 comprising further means located on said frame adjacent said connector structure for operating said liquid pumping means.

16. Apparatus for transporting and storing liquids such as chemicals and the like, comprising:
- (a) a longitudinal frame having wheeled means for supporting one end thereof;
- (b) a pair of spaced cradle support structures secured to said frame, extending upwardly therefrom;
- (c) a platform carried on said frame, extending outwardly from said support structures;
- (d) a tank received between said support structures, said tank being shorter in length than said frame and lesser in diameter than the width of said frame;
- (e) a turret structure secured atop said frame, said turret having a tank closure means located therein below an upper surface thereof;
- (f) support means located at opposite ends of a top side of said tank, said support means extending upwardly to a point above said turret structure;
- (g) a connector structure located at a forward end of same frame, said connector structure extending upwardly from said frame for a predetermined distance and then outwardly away from said frame, said connector structure having a fifth wheel connection means at an outer free end of same;
- (h) liquid pumping means received on said frame at said connector structure and being located at least partially therewithin for pumping liquid from said tank;
- (i) conduit connected between an outlet from said tank and said pumping means; and
- (j) support means secured to said frame adjacent said connector structure, said support means comprising a pair of spaced apart legs and means to raise and lower said legs between a supporting and non-supporting position.

* * * * *